United States Patent
Nishizawa et al.

[11] 3,727,634
[45] Apr. 17, 1973

[54] FLOW QUANTITY CONTROLLING APPARATUS

[75] Inventors: Mitsunori Nishizawa, Kawasaki; Mahiko Kato, Tokyo, both of Japan

[73] Assignee: Tokico Ltd., Kawasaki, Kanagawa-ken, Japan

[22] Filed: Nov. 8, 1971

[21] Appl. No.: 196,522

Related U.S. Application Data

[63] Continuation-in-part of Ser. No. 864,420, Oct. 7, 1969, abandoned.

[52] U.S. Cl. ...................................137/486, 137/84
[51] Int. Cl. ..............................................G05d 7/03
[58] Field of Search.........................137/486, 84, 83, 137/624.11, 624.13, 455; 141/128

[56] References Cited

UNITED STATES PATENTS

| | | | |
|---|---|---|---|
| 2,711,754 | 6/1955 | McKinney | 137/486 |
| 2,853,095 | 9/1958 | Schwendner | 137/486 |
| 3,386,620 | 6/1968 | Smith | 141/128 |

*Primary Examiner*—Henry T. Klinksiek
*Assistant Examiner*—Robert J. Miller
*Attorney*—Maxwell E. Sparrow et al.

[57] ABSTRACT

A flow quantity controlling apparatus comprising means for producing air jet pressure in connection with the flow quantity of a liquid flowing in a conduit, means for receiving said air jet pressure, and means for controlling quantitatively the amount of flow corresponding to the air pressure.

5 Claims, 7 Drawing Figures

FLOW QUANTITY CONTROLLING APPARATUS

This application is a Continuation-In-Part application of the patent application Ser. No. 864,420, "FLOW QUANTITY CONTROLLING APPARATUS" filed on Oct. 7, 1969 by the same applicant now abandoned.

The present invention relates to an apparatus for controlling a flow quantity, particularly to an apparatus for automatically measuring and controlling the quantity of flow of a liquid flowing through a conduit pipe.

A rotary flowmeter such as a volumetric or an integrating flowmeter provided in a conduit pipe for measuring the quantity or total amount of a fluid flowing therethrough has generally a specific adequate range of measuring adapted for its specification since the size of rotor, frequency of rotation and other factors are considerably limited. For example, in the oil shipping and dispensing equipments which need a plurality of oil delivering systems simultaneously operated or singly worked out for land transportations and marine shipments by the use of a pump of large capacity, variations of flow quantity per unit time of a liquid passing through the flowmeter in each oil delivering system are extremely large and often an excessive quantity of liquid is allowed to flow exceeding the proper measuring range of the flowmeter. On this occasion it is desired to provide in the system a flow quantity controlling device or apparatus for regulating excessive flow of liquid, restrain the quantity of flow within an adequate range, and safely guard the flowmeter and other equipments.

Known flow quantity controlling devices comprise for example a mechanical control type which performs a control by detection of pressure difference between before and after a flowmeter which may be proportional to the quantity of the liquid an electrical control type which performs a control by utilizing electric pulses taken from a flowmeter proportionally to the flow quantity. The former mechanical device of the pressure difference type has a disadvantage that it can not afford to measure accurately liquids of high viscosity such as heavy oil or lubricating oil because the viscosity would vary with the change of ambient temperature and specifically the pressure difference in the flowmeter is varied by changes of seasonal temperature so that the accurate control is not possible normally in all seasons. In the latter electrical type of the flowmeter the device requires a great many accessories and parts thereby causing high cost. Besides the electrical device is readily affected by outer disturbances due to electric error pulses produced as for example from sparks so that accutate control is very difficult. Thus it needs some kind of a protection device to avoid fires in the oil due to sparks in time of short circuits, which resulted in a complicated construction of the device.

In the plants of the oil and chemical industries, for supplying and filling a liquid from a source of a large liquid reservoir built on or under the ground to a reservoir or tank for transportation, it is usual to provide a fixed amount supplying and delivering apparatus which can automatically stop the supply and filling of a liquid when a total volume of the flow amount of the liquid reaches a fixed value. For liquids of easily foaming or such liquids as easily generating static electricity by liquid friction or residual gas which should be specially cared for before filling in a reservoir in order to avoid undesirable appearances of foams or static electricity, a multiple stage operation for valve opening is most desired which provided supplying a liquid with the valve properly throttled until the quantity of the liquid exceeds a predetermined volume in the reservoir and thereafter opens the valve fully to obtain the largest flow quantity for supply. Also at the end of filling it is preferred to perform a multistage operation for valve closing by throttling at first the flow quantity considerably before the full closing of the valve and then closing it completely so as to avoid the water hammering and to raise the accuracy of the fixed amount of supply of liquid flow.

The present invention pertains to eliminating of the above mentioned shortcomings of the conventional flow quantity controlling devices as well as to fulfilling of the above requirement recited above.

According to the present invention the flow qutntity controlling apparatus is constructed so that a multistage valve opening or closing operation is obtained in such manner that at the initial stage of filling of a liquid in a reservoir the valve is opened for supplying liquid in a fixed flow quantity $Q_1$ per minute within the limit of avoiding the generating of liquid foams, static electricity or other adverse effects and after the quantity of the liquid has exceeded a predetermined volume in the reservoir, the valve is opened fully to supply the liquid in a flow quantity $Q_2$ per minute at maximum, after completion of the filling of the liquid the valve is throttled to a flow quantity $Q_3$ possibly within the limit causing no water hammering, and finally the valve is rapidly and fully closed. Thus a fixed amount of liquid is supplied by the flow quantity $Q_2$ in the full opening time of valve being controlled to a constant value, and such flow quantities $Q_1$, $Q_2$ and $Q_3$ being adequately adjusted.

A primary object of the present invention is to provide a flow quantity controlling apparatus for controlling the quantity or amount of a liquid flowing through a conduit pipe, which has a simple construction and safe operations and which can readily be adjusted to an adjustment of flow quantity.

Another object of the present invention is to provide a novel flow quantity controlling apparatus which can control the quantity of liquid flowing through a conduit pipe to be constant by using of air both for a detection of flow quantity and a control of valves.

A further object of the present invention is to provide an apparatus for controlling a flow quantity by means of a flow quantity control valve in said pipe in response to pressure signals proportional to the flow quantity per unit time and taken by the intermittent interruption of air jet current through a shield plate rotatable in proportion to the flow quantity in a conduit.

Yet another object of the present invention is to provide a flow quantity controlling apparatus which can perform a multistage valve opening operation automatically such that the valve is first opened in a throttled state to a fixed quantity for avoiding the appearance of liquid foams and static electricity due to liquid friction and thereafter is fully opened for supplying the liquid in the maximum quantity.

Still another object of the present invention is to provide a flow quantity controlling apparatus which is capable of automatic valve opening in multiple stages such that the opened valve is first throttled to some extent before a liquid is completely supplied so as to avoid the water hammering, and then the valve is closed fully when the total flow amount of the liquid reaches a determined value.

Other objects and advantagew sill be apparent from the following description when read with reference to the accompanying drawings, in which.

Figure 1:
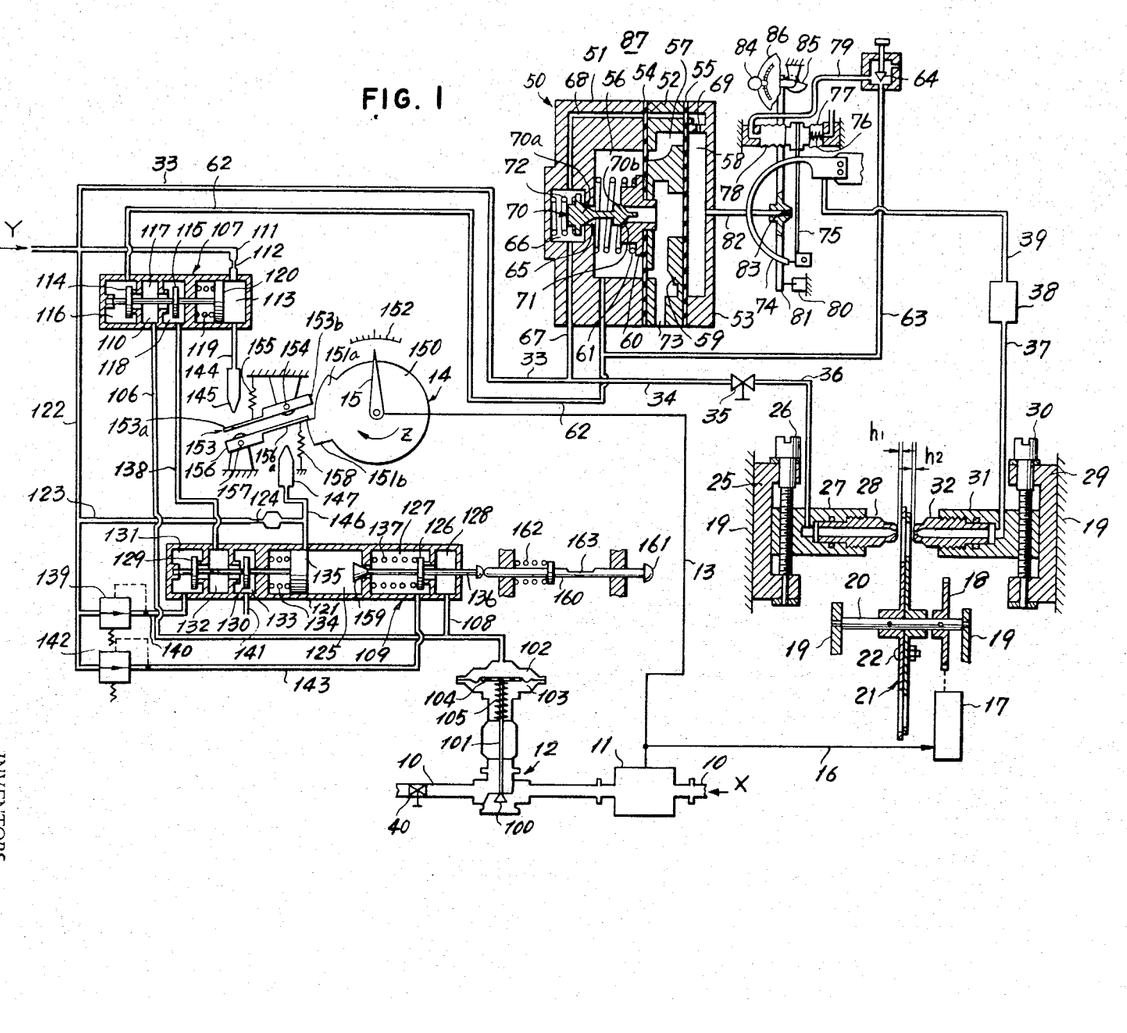
FIG. 1 is a partial sectional view of an embodiment showing schematically the system of the present invention.

In FIG. 1, an embodiment of the present invention is shown partially in section and partly schematically. In the figure a liquid such as gasoline flows from a fixed reservoir as a liquid source (not shown) through a liquid supply conduit pipe 10 in the direction of an arrow X. The liquid passes through a flowmeter 11 and further through a flow quantity control valve 12 to a reservoir for transportation to which said liquid is supplied (not shown). The flowmeter 11 is of a volumetric or integrating type, in the interior of which rotation of a rotor corresponding to the flow quantity or amount is transmitted to a pointer 15 of a flow quantity indicator or a flow amount indicator 14 through a rotation transmission shaft 13.

Figure 3:
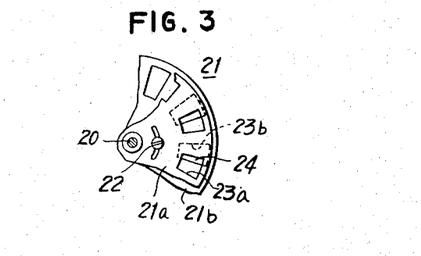
FIG. 3 is a partial front view of an embodiment of the shield plate.

Simultaneously, a rotation of the flowmeter 11 is transmitted to a gear train 17 and then to a gear 18 through a rotation transmission shaft 16. On a shaft 20 the gear 18 is fixed and the shaft 20 is rotatably arranged on chassis frame 19, carrying rigidly a shield plate 21. The shield plate 21 is, as shown in FIG. 3, consists of a main disk 21a secured on shaft 20 and an auxiliary disk 21b loosely fitted on shaft 20 and fastened adjustably on disk 21a by a screw 22. On disks 21a and 21b are respectively a plurality of main slits 23a and auxiliary slits 23b at equal intervals on the same circle. The manner of overlapping of two slits 23a and 23b corresponding to the relative positions of the disks 21a and 21b will determine the area of openings 24 penetrating through the shield plate 21 in the axial direction. Therefore, the area of the openings 24 is preferably determined by unlocking of the screw 22 and setting the fixed position of auxiliary disk 21b with respect to the main disk 21a.

An adjustable screw 26 is threaded in a nozzle holder 27 and supports the holder on a support 25 on the chassis frame 19. The holder 27 carries an air injection nozzle 28, the front end of which is located at an interval $h_1$ from the shield plate 21. By turning of the screw 26 the location of the front end of the nozzle tip 28 is adjusted in the axial direction of the screw 26, that is, in the radial direction of the shield plate 21. An adjustement screw 30 is threaded in a nozzle holder 31 and supports the holder on a support 29 secured to the frame 19. The nozzle holder 31 carries a pressure receiving nozzle 32 at an interval $h_2$ from the shield plate 21 so that the pressue receiving hole at the forward end of the holder 31 is directed toward the hole of the injection nozzle 28 with the shield plate 21 therebetween. It is also possible to adjust the position of the nozzle 32 in the radial direction of the shield plate 21 by the screw 30. The screws 26 and 30 may be so provided as to be operated from the outside simultaneously performing an adjusting operation through connection of suitable transmission means.

Compressed air delivered from a compressed air source (not shown) in the direction of an arrow Y is supplied to the nozzle 28 through pipes 33 and 34, a pressure control valve 35 and a pipe 36 and is injected from the injection hole at the forward end of the nozzle. The pressure of the air injected from the nozzle 28 is received by the nozzle 32 through opening 24 of the shield plate 21 in rotation and delivered through a pipe 37, a pressure adjusting part 38 and a pipe 39 to a Bourdon tube 74. On the outlet side of the control valve 12 in the conduit 10 is provided an opening and closing valve 40.

A main body of a controlling part 50 consists of casings 51, 52, and 53 tightly connected together. Between casings 51, 52, and 53 are respectively provided flexible partition members 54 and 55 such as bellows or diaphragms. In each casing is formed a supply air chamber 56, an exhaust air chamber 57 and a relay chamber 58, each partitioned from the other chambers. It may be preferably provided that the pressure receiving area on the relay chamber 58 side of the diaphragm 55 is larger than the pressure receiving area on the supply air chamber 56 side of the diaphragm 54. A diaphragm receiver 59 is disposed between the diaphragms 54 and 55 and an exhaust valve seat 60 is connected to the diaphragm receiver 59 having the diaphragm 54 therebetween. A spring 61 which is arranged between the casing 51 and the exhuast air valve seat 60 compresesses both diaphragms 54 and 55 to the right in the figure through the exhaust air valve seat 60. The supply air chamber 56 is connected to a changeover valve mechanism 107 through a pipe 62 and is further connected through a pipe 63 to a pressure control valve 64. The supply air chamber 56 is a communicated to the compressed air source through a supply air port 65, a supply air valve chamber 66, pipes 67 and 33, and the supply air valve chamber 66 is further connected to the relay chamber 58 through an air passage 68 and an orifice 69. A supply and exhaust air valve 70 is provided so that its supply air valve part 70a is located in the supply air chamber 66 to open and close the supply air port 65, and its exhaust air valve part 70b is located in the supply air chamber 56 to open and close an exhaust air port 71 of the exhaust air valve seat 60, both being urged to close the ports 65 and 71 by a spring 72. The exhaust air chamber 57 is connected to the outside atmosphere through an air hole 73.

A beam 75, one end of which is pivoted at the forward end of the Bourdon tube 74, has its other end carried between a bellows 77 having a spring 76 inside thereof, and a bellows 78 is always extended by the internal pressure of the supply air chamber 56 through the pipe 63, the pressure control valve 64 and the pipe 79. An arm 81 pivoted on a support portion 80 fixed on the frame with one end has a nozzle 83 fitted to a forward end of a fixed pipe 82 connected to the relay chamber 58 and opposite to the beam 75, the other end of said arm being in engagement with a cam 85 rotatable with a setting knob 84. In response to the position of the knob 84 the arm 81 rotates and is displaced whereby the interval between the nozzle 83 and the beam 75 is adjusted. Opposite to the knob 84 is provided a dial plate 85 to indicate the setting of the flow quantity. Thus, a second pressure control valve mechanism 87 is constituted by the construction including the control part 50, the Bourdon tube 74, the nozzle 83 and the beam 75.

A valve body 100 of the valve 12 opens and closes by its upward and downward operation and controls the flow quantity of liquid flowing through the conduit 10. The valve rod 101 having the valve 100 on one end has its other end fixed to a flexible partition member 104 such as a bellows or a diaphragm to divide the inside of the body into two chambers 102 and 103. A spring 105 is provided to press the diaphragm 104 against the chamber 102 forcing to close the valve 100. The chamber 102 is connected to the second changeover valve mechanism 107 through a pipe 106 and to a first changeover valve mechanism 109 through a pipe 108.

In another embodiment, a valve positioner may be provided on the flow quantity control valve 12 so that the flow quantity control can be performed more stably without any influence of noise components such as a hunting. In this case, the valve positioner is connected to the pipes 108 and 106.

Inside a main body 110 of the second changeover valve mechanism 107 is a pressure valve chest 113 provided to which air is supplied from the compressed air source through a pipe 111 and a orifice 112 and valve chests 116, 117, and 118 separated from said chest 113 and respectively separated from or connected with each other by valve bodies 114 and 115. In the chest 113 is a piston 120 slidingly fitted, urged to the right direction by a spring 119. The valve bodies 114 and 115 are secured to a slidable rod fixed to the piston 120 and are normally in positions shown in the figure by force of a spring 119. The valve body 114 contacts an opened valve seat provided between the valve chests 116 and 117 and closes therebetween. The valve body 115 is spaced away from an opened valve seat provided between the valve chests 117 and 118 and opens therebetween.

In a main body 121 of the first changeover valve mechanism 109, there are provided valve chests 125, 127, 128, 131, 132, 133 partitioned with each other. The chest 125 can be supplied with the air from the compressed air source through pipes 122 and 123 and an orifice 124. Valve bodies 129 and 130 and a piston 135 respectively fixed on one slidable rod are respectively in valve chests 131, 133 and 125. In a state shown in the figure, the piston 135 is urged to slide rightwardly by a force of a spring 134 provided between the piston 135 and a partition wall and is at a position to just close an opening of a pipe derived from the orifice 124. The valve body 129 contacts an opened valve seat provided between the chests 131 and 132 and closes therebetween. The valve body 130 is apart from an opened valve seat provided between the chests 132 and 133 and opens therebetween. The valve body 126 fixed on a valve rod 136 extending outwardly through the main body 121 is in the chest 127 and is urged to slide rightwardly by force of a spring 137. In a state shown in the figure, the valve body 126 contacts an opened valve seat provided between the chests 127 and 128 and closes therebetween. A valve body 159 fixed on the forward end of the valve rod 136 contacts an opened valve seat provided between the chests 125 and 127 and closes therebetween in a state shown in the figure.

A forward end of a rod 160 contacts the end portion of the valve rod 136 which is outside of the main body 121. An operating knob 161 is provided at the other end of the rod 160. The rod 160 is normally urged to slide rightwardly in the figure by force of a spring 162. The rod 160 is provided with an engaging recess 163.

In the second changeover valve mechanism 107, the chest 116 is connected to the pipe 62; the chest 117 to the pipe 106, and the chest 118 to a pipe 138 respectively. Also in the first changeover valve mechanism 109, the chest 131 is connected to the compressed air source through the pipe 140, a bleader type pressure reducing (pressure controlling) valve 139 and a pipe 122; the chest 132 is connected to the pipe 138, the chest 133 to the atmosphere through an exhaust air hole 141, the chest 127 to the compressed air source through a pipe 143, a bleader type pressure reducing (pressure controlling) valve 142 and the pipe 122; and the chest 128 is connected to the pipe 108, respectively. The diameters of the pipes 122 and 143 are several ten times as large as the diameter of the exhaust air hole 141. There is provided a nozzle 145 connected from the chest 113 through a pipe 144 and a nozzle 147 connected from the chest 125 through a pipe 146.

A rotary cam 150 of the flow amount indicator 14 has stepped portions 151a and 151b on the periphery thereof and is rotated by the rotation transmitted from the rotation transmission shaft 13. With the rotation of the cam 150 in the direction of an arrow Z, the pointer 15 provided with a rotational ratio relative to the cam rotates, indicating on a scale 152 a flow amount. A flapper 153 can rotate on a fulcrum 154 supported on the frame. One end 153a of the flapper 153 is urged to close the injection hole of the nozzle 145 by a spring 155, and the other end 153b engages the first step 151a and the second step 151b of the cam 150. A flapper 156 can rotate on a fulcrum 157 supported to the frame. The forward end 156a of the flapper 156 is urged to close the injection hole of the nozzle 147 by a spring 158 and can engage only the second stepped portion 151b of the cam 150.

Operations of the flow quantity controlling apparatus of the above described construction according to the present invention will now be described.

Before operation, the stepped portions 151a and 151b of the cam 150 are respectively engaging the flappers 153 and 156. The two flappers 153 and 156 are at a distance from the nozzles 145 and 147. Accordingly, the pressure valve chest 113 of the second changeover valve mechanism 107 is connected to the atmosphere through the nozzle 145 and is under a reduced pressure. The piston 120 is displaced to the right in the figure by the spring 119. The valve body 114 closes the passage between the valve chests 116 and 117 and the valve body 115 opens the passage between the valve chests 117 and 118. Similarly, the pressure valve chests 125 of the first changeover valve mechanism 109 is connected to the atmosphere through the nozzle 147 so that the valve body 129 closes the passage between the valve chests 131 and 132 and the valve body 130 opens the passage between the valve chests 132 and 133. At this instant, the valve body 126 fixed at the rod 136 closes the passage between the valve chests 127 and 128 by the spring 137 and the valve body 159 closes the passage between the valve chests 125 and 127. Therefore, the chamber 102 of the valve 12 is connected to the atmosphere through the exhaust hole 141 through the pipe 106, the chests 117 and 118, the pipe 138, and the chests 132 and 133. The diaphragm 104 is displaced to the chamber 102 side by the spring 105 and the valve 100 is retained in the closed position.

When the knob 84 is set to a predetermined position on the setting dial place 86 to determine the constant flow quantity the arm 81 is set at a determined position. On the other hand the Bourdon tube 74 is under a pressure from the pressure receiving nozzle 32 which has received a jet flow from the injection nozzle 28 through the shield plate 21. The tube 74 is stopped and stays in a determined position so that the nozzle 83 and the beam 75 are located at a determined distance from each other. When the knob 84 is properly adjusted to increase the distance between the beam 75 and the nozzle 83, the front end of the nozzle 83 is moved further away from the beam 75 and is opened to the atmosphere resulting in that the compressed air in the relay chamber 58 is discharged through the pipe 82 and the nozzle 83 to the atmosphere. Since the compressed air from the compressed air source fed to the relay chamber 58 is throttled entering from the orifice 69, the internal pressure in the chamber 58 is gradually lowered. Thus the diaphragms 54 and 55 shift together to the relay chamber 58 side by the tension force of the spring 61 and the internal pressure of the supply air chamber 56.

At this time the supply air port 65 is retained in a closed position by the supply air valve part 70a of the supply and exhaust air valve 70, while the exhaust air port 71 is opened by the exhaust air valve part 70b. The supply air chamber 56 communicates to the atmosphere through the exhaust air port 71, the exhaust air chamber 57 and the air hole 73 thus effecting air discharge. Its internal pressure goes down and accordingly the internal pressure of the bellows 78 connected to the chamber 56 is lowered. By lowering of the internal pressure in the bellows 78 the pressure balance is lost between the pressures in the bellows 78 and 77 which houses the spring 76. The beam 75 of which one end is pivotably connected to the Bourdon tube 74 is displaced to the left in the figure and moves close to the nozzle 83. Thereafter, the internal pressure of the relay chamber 58 rises and the diaphragms 54 and 55 are moved reversely to the left, that is to the supply air chamber 56 side.

As the diaphragms 54 and 55 shift to the left the exhaust air port 71 in the exhaust air valve seat 60 is closed by the exhaust air valve part 70b. With further shifting of said both diaphragms to the left the supply and exhaust air valve 70 is displaced to the left against the force of the spring 61 on the valve seat 60 and the supply air port 65 is opened. Consequently, the compressed air from the compressed air source flows into the supply air chamber 56 through the pipes 33 and 67 and the supply air valve chamber 66. The diaphragms 54 and 55 receive the compressed air and shift to the right. The exahaust air port 71 opens by lifting of the valve part 70b. Simultaneously the internal pressure of the bellows 78 connected to the supply air chamber 56 rises with the opening of the supply air port 65 so that the beam 75 is displaced to the right and separated from the nozzle 83. Correspondingly the internal pressure of the relay chamber 58 decreases slowly and the diaphragms 54 and 55 shift further to the right. By this shift of the diaphragms the exhaust air port 71 is opened and by the same action as above the diaphragms 54 and 55 shift again to the supply air chamber 56 side. The above operation is thus repeated and the internal pressure of the supply air chamber 56 is retained at a pressure level corresponding to the interval and position of the beam 75 and the nozzle 83 as predetermined.

Figure 6:
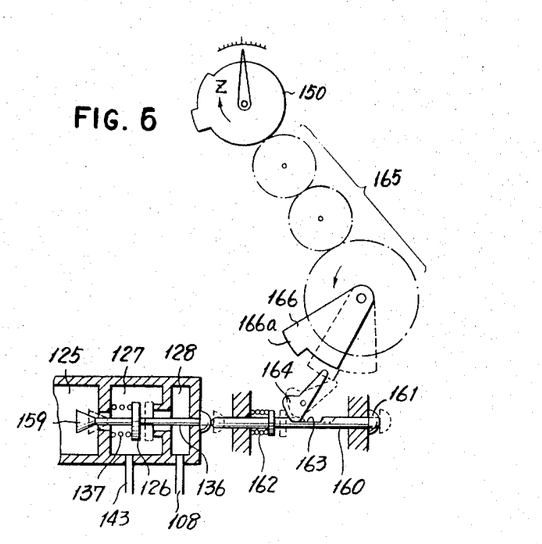
FIG. 6 is an illustrative view of one embodiment of a lock and unlock mechanism for an operating valve rod.

When the liquid is intended to start to flow through the conduit pipe 10, the knob 161 is manually pushed to move the rod 160 leftwardly in the figure. The valve rod 136 is also moved leftwardly against the force of the spring 137 by the pushing movement of the rod 160. At this instant, an engaging cam 164 falls into the engaging recess 163 of the rod 160, as shown in FIG. 6, and the rods 160 and 136 are locked and held at the leftwardly slided position. By the leftward moving of the valve rod 136, the valve body 126 opens the passage between the chests 127 and 128 and the valve body 159 opens the passage between the chests 125 and 127. Consequently, by the opening of the valve body 126, the air from the compressed air source flows into the chamber 102 of the valve 12 through the pipe 122, reducing valve 142, pipe 143, chests 127 and 128, and pipe 108. The diaphragm 104 is displaced to the chamber 103 side, the valve 100 opens, the liquid flows through the conduit pipe 10 in the direction of arrow X, and the flowmeter 11 starts to measure the flow quantity. The opening rate of the valve 100 is determined by the inner pressure of the chest 102. The inner pressure of the chest 102 is determined by the set value of the reduced pressure of the reducing valve 142.

On the other hand, when the valve body 159 opens the passage between the chests 125 and 127, the compressed air flowed through the pipe 143 into the chest 127 flows into the chest 125 so that the piston is removed in leftward in the figure against the force of the spring 134. Here, since the diameters of the pipes 122 and 143 are several ten times as large as the diameter of the exhaust hole 141, the compressed air flowed through the pipe 143 into the chest flows into the chest 125 in a very large volume than that of the air which may be exhausted from the exhaust hole 141 and can effectively pushing the piston 135. Moreover, the diameter of the tip portion of the nozzle 147 is 0.5 mm and the diameter of the opened valve seat between the chests 125 and 127 is 10 mm, for example. Therefore, the ratio of opening areas of the tip portion of the nozzle 147 and the opened valve seat between the chests 125 and 127 is almost several hundred times. Consequently, the compressed air flowed into the chest 125 from the chest 127 is slightly discharged from the nozzle 147, while the compressed air in the chest 125 acts on the piston 135 to move it leftwardly in the figure. The valve body 129 and 130 move leftwardly together with the piston 135 and opens the passage between the chests 131 and 132 and close the passage between the chests 132 and 133, respectively. By the closing of the valve body 130, the pipe 106 is interrupted the connection with the exhaust hole 141 so that the compressed air passed through the pipe 108 is all supplied to the chest 102. At that time, the pipe 140 provided with the reducing valve 139 is communicated to the pipe 108 through the chests 131 and 132, pipe 138, chests 118 and 117 and pipe 106 by opening of the valve body 129. The reducing valve 139 receives the pressure of the compressed air passed through the reducing valve 142. The relation of the pressures $P_1$ and $P_2$ of the reducing valves 142 and 139 is selected as follows: $P_1 > P_2$. Generally, the bleeder type pressure reducing (pressure controlling) valve is constructed to maintain the set pressure at the constant value and to operate in such a manner that the pressure tends to come up to the higher set pressure. The reducing valve 139 bleeds the air by the air pressure of which value is determined by the reducing valve 142 and the pressure in the chest 102 is set at the pressure determined by the reducing valve 142 and supplied through the pipe 108.

Figure 5:
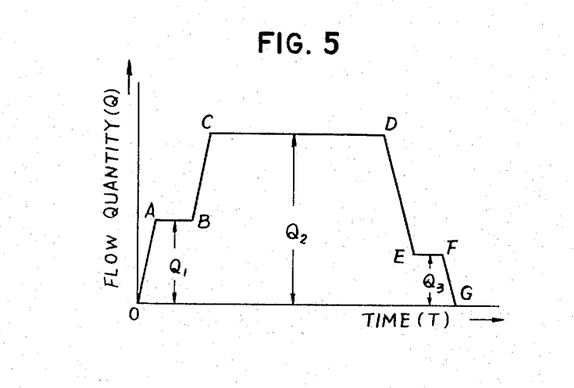
FIG. 5 is a diagram showing characteristics of the flow quantity of a liquid that has passed through a flow quantity control valve.

With the opening of valve 100 by opening of the valve 126, the flow quantity of the liquid per unit of time flowing through the conduit 10 will vary as shown by a line $\overline{OA}$ in FIG.5, reaching the flow quantity $Q_1$ as determined by the setting of the opening of the reducing valve 142, and thereafter flows in a determined flow quantity $Q_1$ between points A and B along a line $\overline{AB}$. The opening rate of the reducing valve 142 is determined in a manner such that the flow quantity $Q_1$ is set at a value causing no foaming, static electricity and other adverse effects during the supplying and dispensing of the liquid into a reservoir for transportation.

Figure 4:
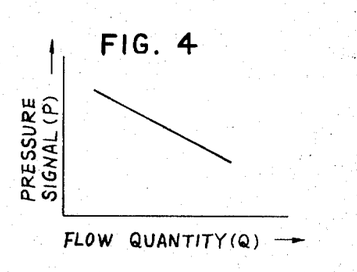
FIG. 4 is a diagram showing characteristics of the flow quantity Q relative to the pressure signal P in a second pressure control valve mechanism.

As the liquid flows in the conduit 10 the rotor of the flowmeter 11 rotates. The rotation is reduced in speed and transmitted for rotating the shield plate 21. As the jet air from the injection nozzle 28 is intermittently interrupted by the rotating shield plate 21 having openings 24 the pressure signal P on the pressure receiving nozzle 32 varies in an inverse proportion to the frequency of rotation of the shield plate 21 or the flow quantity Q as shown in FIG.4. The Bourdon tube 74 receives the pressure signal which the nozzle 32 has received and is displaced. Together with said tube the beam 75 is displaced. Thus by the similar operation at the time of the above initial setting operation, the internal pressure of the supply air chamber 56 is reduced to a fixed amount. The connection of the second pressure control valve mechanism 87 and the valve 12 is interrupted by the valve body 114 which closes the passage of the chests 116 and 117 of the second changeover valve mechanism 107.

As the measuring of the flow amount with respect to the flow quantity $Q_1$ proceeds and as the liquid in the reservoir for transportation exceeds a determined volume such as avoiding the above mentioned adverse effects, the flappers 153 and 156 are disengaged from the stepped portions 151a and 151b of the rotating cam 150 the rotation of which is transmitted in reduced speed from the flowmeter 11. Thus, as shown in FIG.2A, both flappers 153 and 156 are respectively rotated by the springs 155 and 158 and close the front ends of the nozzles 145 and 147.

The rotation of the cam 150 is transmitted to a cam 166 through a gear train 165 and the cam 166 is rotated in a counterclockwise direction in the figure. As the cam 166 rotates, a projecting portion 166a thereof pushes one end of the engaging cam 164 so as to revolve the cam 164. The cam 164 leaves from the recess 163 of the rod 160 by its revolving and becomes to be free from the engaging with the rod 160. The rods 136 and 160 slide rightwardly in the figure by force of the springs 137 and 162, whereby the valve bodies 126 and 159 respectively close the passage between the chests 127 and 128 and the passage between the chests 125 and 127.

Figure 2A:
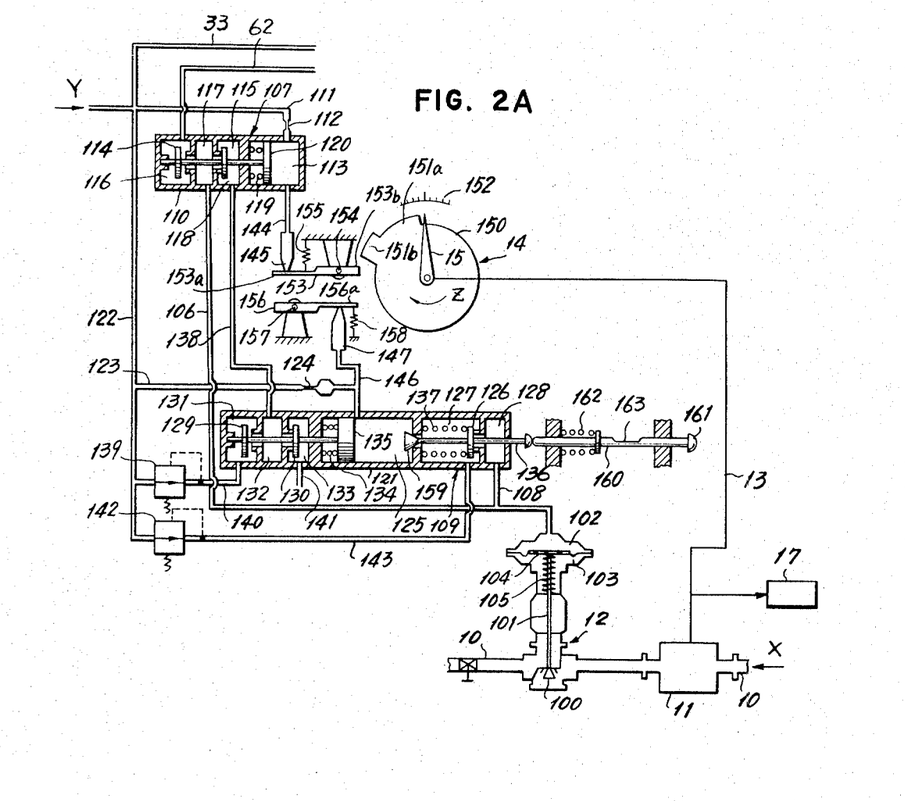
FIGS. 2A and 2B respectively show the operation of an essential part of the apparatus of FIG. 1 at the times of full opening and half opening of a stop valve.
Figure 2B:
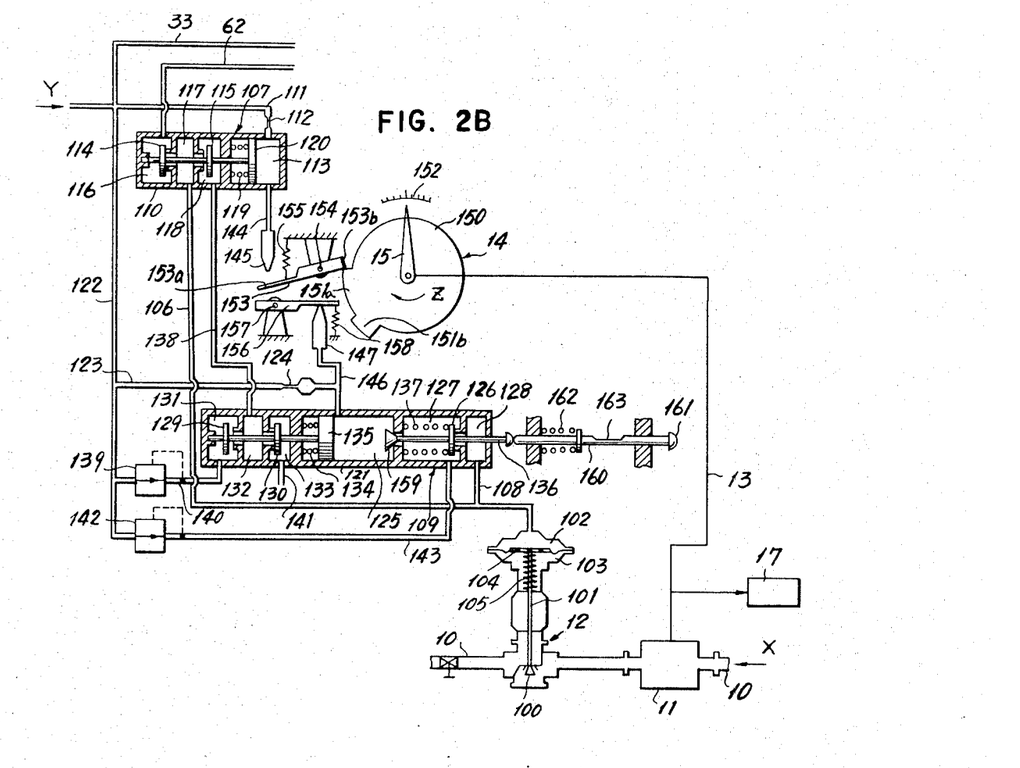

As shown in FIG.2A, the internal pressure of the chamber 125 rises with the closing of the nozzle 147. The piston 135 shifts to the left. The valve 129 opens and the valve 130 closes. On the other hand, by closing of the nozzle 145 the internal pressure of the chamber 113 rises and the piston 120 shifts to the left. The valve 114 opens and the valve 115 closes. Accordingly, a predetermined pressure in the supply air chamber 56 of the controlling part 50 is transmitted to the chamber 102 of the valve 12 through the pipe 62, the chests 116 and 117, and the pipe 106 so that the diaphragm 104 shifts to the lower part against the spring 105 and consequently opening of the valve 100 is enlarged and the flow quantity of the liquid in the conduit 10 is increased as shown by a line $\overline{BC}$ in FIG.5.

With the increase of the flow quantity, the frequency of rotation of the rotor of the flowmeter 11 increases and the frequency of rotation of the shield plate 21 increases accordingly so that the pressure amount of the pressure receiving nozzle 32 decreases. The Bourdon tube 74 contracts as its internal pressure is lowered and the beam 75 is moved away from the nozzle 83. By said movement of the beam 75 air discharge is performed in the supply air chamber 56 and the internal pressure in said supply air chamber or the internal pressure in the chamber 102 is retained at a determined control pressure. Opening of the valve 100 is thus made stable and the flow quantity of the liquid flowing in the conduit pipe 10 reaches a constant maximum flow quantity $Q_2$ as determined, as shown by a line $\overline{CD}$ in FIG.5. When the flow quantity $Q_2$ is constant the pressure signal P taken on the pressure receiving nozzle 32 side is constant and the Bourdon tube 74 is located at a determined position corresponding to the signal pressure.

Descriptions will now be made on the flow quantity controlling operation carried out during quantitative measurement of the liquid flowing at the maximum flow quantity $Q_2$ as hereinbefore described.

In a system for delivering the liquid in a plurality of conduit pipes by means of a single pump of great capacity when the liquid flows at the flow quantity of $Q_2$ in the conduit 10 the flow quantity of the liquid in the conduit 10 would vary when the number of conduit pipes in use is changed. If at this moment the flow quantity of the liquid in the conduit 10 be lowered by the causes as described the rotating frequency of the rotor of the flowmeter 11 will be lowered so that correspondingly the rotating frequency of the shield plate 21 will be lowered. The pressure signal which the pressure receiving nozzle 32 would receive will become large, the Bourdon tube 74 will move extend, and the beam 75 will close to the nozzle 83. In response to these actions the internal pressure of the relay chamber 58 will rise, consequently the supply air valve part 70a will open the supply air port 65 by the similar operation as described above. As the result the compressed air from the compressed air source is delivered into the supply air chamber 56 and into the chamber 102. The opening of the valve 100 grows larger and the flow quantity increases. Also by rise of the internal pressure of the supply air chamber 56 the diaphragms 54 and 55 are pushed back until the valve part 70a of the supply and exhaust air valve 70 closes the supply air port 65, and by rise of the internal pressure of the bellows 78 the beam 75 is moved away from the nozzle 83. The internal pressure of the relay chamber 50 is thus lowered. As the diaphragms 54 and 55 are displaced as described above and the exhaust air port 71 is opened the diaphragms 54 and 55 start again to shift to the left in the same manner as at the time of setting as mentioned previously. By this operation a constant flow quantity $Q_2$ is retained.

Inversely, when the flow quantity of the liquid increases beyond the quantity $Q_2$ in the conduit 10 the frequency of rotation of the shield plate 21 increases and the pressure receiving signal of the nozzle 32 is reduced to a small value, the Bourdon tube 74 contracts, and the distance between the beam 75 and the nozzle 83 becomes large. Correspondingly, the internal pressure of the relay chamber 58 slowly decreases so that the diaphragms 54 and 55 shift to the right and the exhaust air port 71 is opened. Thereby the supply air chamber 56 and the chamber 102 of the valve 12 communicate with the atmosphere and their internal pressures are lowered. Therefore, the diaphragm 104 is diaplaced upwardly by the force of the spring 105 and correspondingly the opening of the valve 100 is throttled. The excessive flow quantity is reduced and a determined flow quantity $Q_2$ is maintained.

As the flow of the liquid in the flow quantity $Q_2$ continues and when it reaches a point as shown in FIG.5 or a determined flow amount of the first stage closing of the valve, the stepped portion 151a of the cam 150 rotating in the direction of the arrow Z engages with the flapper 153, rotates it counterclockwise against the spring 155 and releases the forward end of the nozzle 145, whereby the internal pressure of the pressure valve chest 113 of the second changeover valve mechanism 107 is lowered. The piston 120 shifts to the right by the force of the spring 119, consequently the valve 114 is closed and the valve 115 is opened. Accordingly, the communication of the pipe 62 and the pipe 106 or the communication of the pressure control valve mechanism 87 and the flow quantity control valve 12 is cut off and the compressed air from the compression air source is introduced into the chamber 102 of the valve 12 through the pipe 122, the pressure reducing valve 139, the valve chests 131 and 132 of the first changeover valve mechanism 109, the pipe 138, the valve chests 118 and 117 of the second changeover valve mechanism 107 and the pipe 106. The internal pressure of the chamber 102 at this time is determined by the pressure corresponding to the setting of the reducing valve 139. Since opening of the valve 139 is throttled much more than the opening of the valve 142 the internal pressure of the chamber 102 lowers and the diaphragm 104 moves upwardly, the opening of the valve 100 being reduced to a small amount. Thereby the flow quantity of the liquid flowing in the conduit 10 decreases as shown by a line $\overline{DE}$ of FIG.5. As the opening of the valve 100 becomes stable the liquid flows correspondingly in a constant flow quantity $Q_3$ as shown by a line $\overline{EF}$. The flow quantity $Q_3$ is the value within the limit that may not cause the water hammering as hereinbefore described, and it is determined by setting of the opening of the reducing valve 139.

As the liquid flow in the above flow quantity $Q_3$ continues and measuring by the flowmeter 11 proceeds, when the total flow amount of the liquid reaches a predetermined amount set before operation or a predetermined amount of filling in a reservoir for transportation, the second stepped portion 151b of the cam 150 again engages with the forward end 156a of the flapper 156, rotates it counterclockwise against the spring 158 and releases the forward end of the nozzle 147, whereby the internal pressure of the valve chest 125 of the first changeover valve mechanism 109 is lowered. The piston 135 is displaced to the right in the figure by the force of the spring 134. The valve 129 closes and the valve 130 opens. Consequently, the internal pressure of the chamber 102 of the valve 12 is released to the atmosphere through the pipe 106, the valve chests 117 and 118 of the second changeover valve mechanism 107, the pipe 138, the valve chests 132 and 133 of the first changeover valve mechanism 109 and the exhaust air hole 141. The diaphragm 104 moves upwardly by the spring 105 and the valve 100 closes. The flow quantity is reduced as shown by a line FC in FIG.5. When the valve 100 fully closes, the filling of a fixed total amount into the reservoir is accomplished whereby one cycle of the automatic fixed quantity liquid supplying operation is accomplished. At the same time with finishing of the liquid supply, the flowmeter 11 stops its rotation, the cam 150 stops its rotation in a state shown in FIG.1 and other components all stop their movements in the states shown in FIG.1 so that the apparatus prepares the next cycle of the automatic fixed quantity liquid supplying operation.

If the liquid filled in the reservoir is of such a kind that it will not cause foaming, static electricity and other adverse effects at the initial period of filling the apparatus may be constructed such that the piston 120 of the second changeover valve mechanism 107 will be manually operated, and it is operated manually at the beginning of filling and measuring of the liquid. Thereby the valve body 114 is opened and the valve body 115 is closed, the pressure control mechanism 87 and the flow quantity control valve 12 will communicate each other and it will be possible to flow the liquid in the conduit 10 at the constant maximum flow quantity $Q_2$ immediately after beginning of filling and measuring of the liquid and to shorten the time of the operation of filling the liquid.

It will be obvious to those skilled in the art, that various changes may be made in the invention without departing from the spirit and scope thereof, and therefore, the invention is not limited by that which is shown in the drawings and described in the specification, but only as indicated in the appended claims.

What we claim is:

1. A flow quantity controlling apparatus comprising a control valve for controlling a flow quantity of a liquid flowing through a conduit, a flowmeter for measuring the flow quantity of the liquid flowing through the conduit, a rotary shield plate rotated by rotations transmitted from said flowmeter in proportion to said flow quantity, said rotary shield plate being provided with slits, an air jet means for injecting air to said shield plate, an air pressure receiving means for receiving a pressure of the air jet injected from said air jet means and passed through said slits of said rotary shield plate, and a controlling means for controlling an opening and closing of said control valve by receiving the air pressure from said air pressure receiving means.

2. The flow quantity controlling apparatus as defined in claim 1 wherein said rotary shield plate comprises a plurality of shield plates which respectively have slits and are so constructed that the slits are adjustable in their mutual relative positions so that an area of an opening common to respective slits can be adjusted.

3. The flow quantity controlling apparatus as defined in claim 1 wherein said controlling means for controlling an opening and closing of said control valve comprises a first pressure supplying means for supplying a first pressure to said control valve, said first pressure determining a valve opening rate so that the flow quantity of the liquid becomes a first predetermined flow quantity $Q_1$, a second pressure supplying means for supplying a second pressure to said control valve in response to air pressure supplied from said air pressure receiving means, said second pressure determining the valve opening rate so that the flow quantity of the liquid becomes a second predetermined flow quantity $Q_2$ larger than the flow quantity $Q_1$, and a third pressure supplying means for supplying a third pressure to said control valve, said third pressure determining the valve opening rate so that the flow quantity of the liquid reaches a third predetermined flow quantity $Q_3$ smaller than the flow quantity $Q_2$.

4. The flow quantity controlling apparatus as defined in claim 3 wherein said controlling means further comprises a cam rotating by being transmitted the rotations from said flowmeter, and a changeover means for sequentially changing over the pressure supplyings of said first, second and third pressure supplying means to said control valve.

5. The flow quantity controlling apparatus as defined in claim 3 wherein said second pressure supplying means includes a constant flow quantity valve controlling means which is so constructed that the second pressure supplying means makes the opening rate of the flow quantity controlling valve to be constant by a predetermined pressure so that the flow quantity per unit time is maintained to be constant, said constant flow quantity valve controlling means performing a valve action to cancel variations of the received air pressure of said air pressure receiving means corresponding to the variation of the flow quantity.

* * * * *